Jan. 22, 1924.
J. L. COHEN
1,481,253
VEHICLE WHEEL
Filed Feb. 25, 1922   2 Sheets-Sheet 1
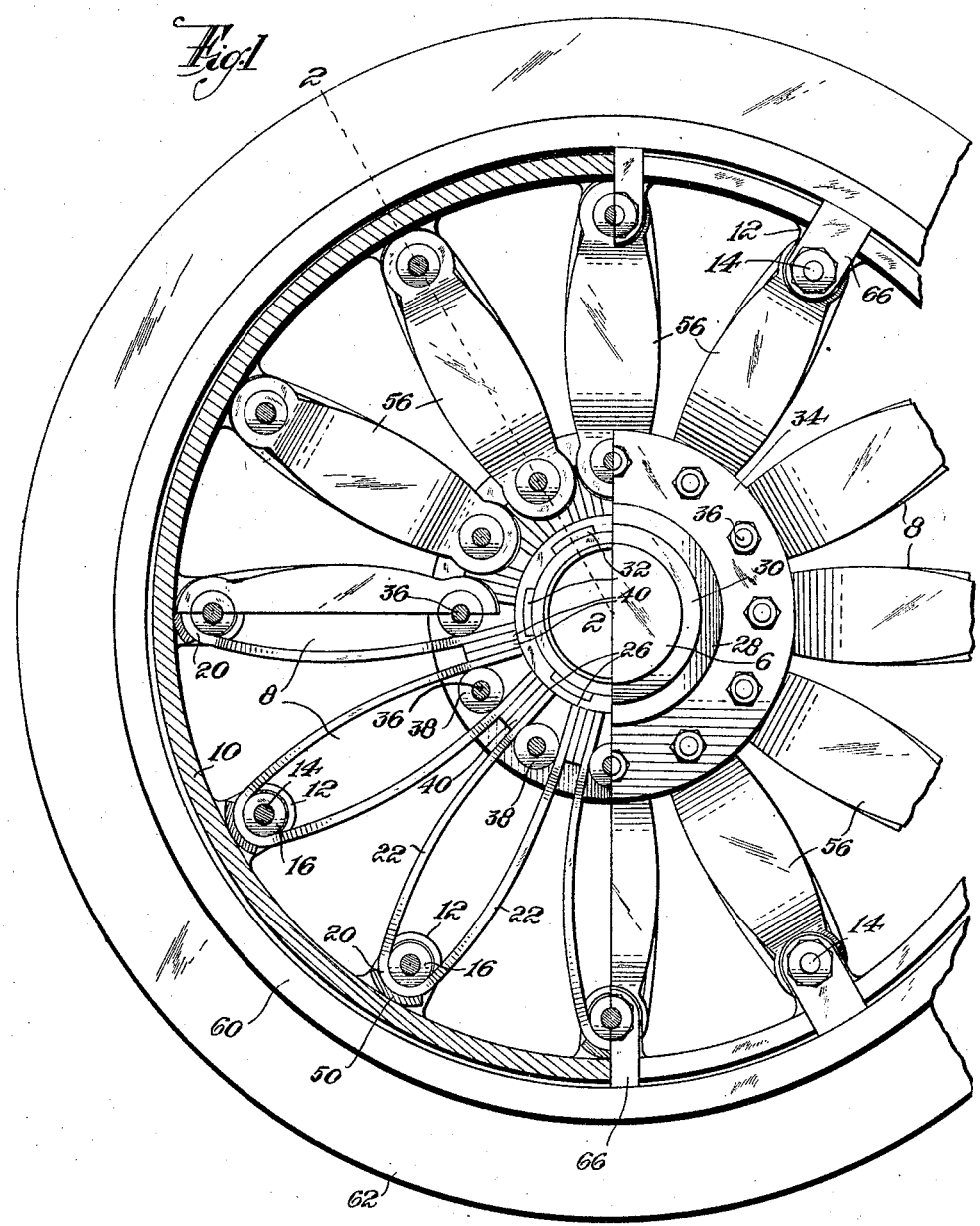

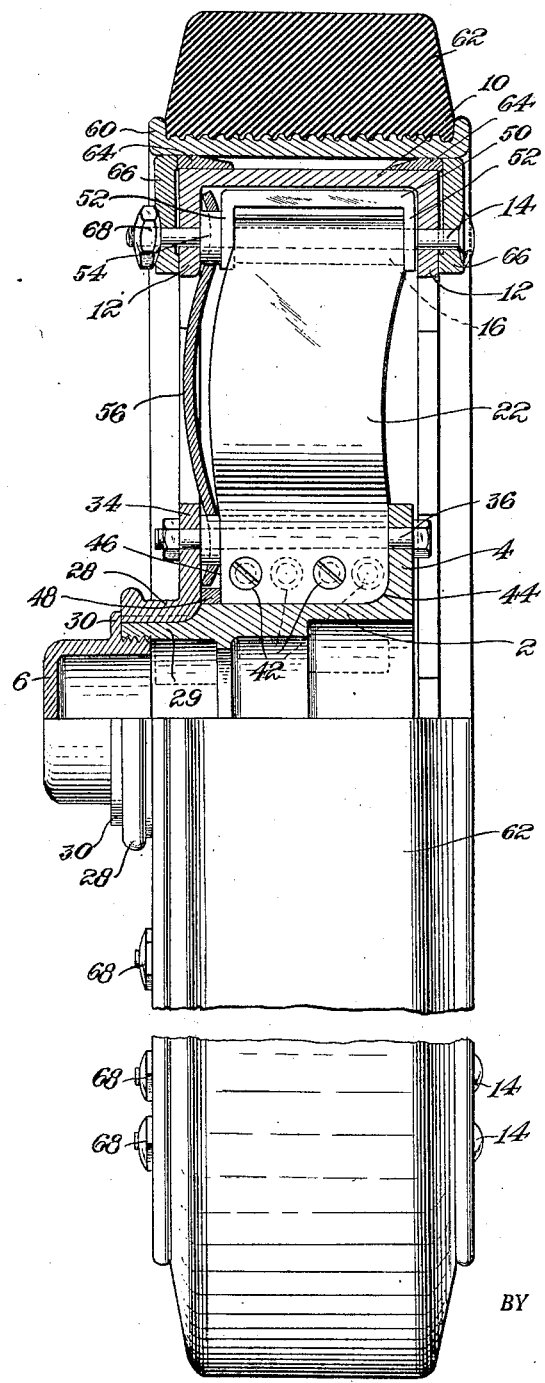

Patented Jan. 22, 1924.

1,481,253

UNITED STATES PATENT OFFICE.

JOSEPH L. COHEN, OF NEW YORK, N. Y.

VEHICLE WHEEL.

Application filed February 25, 1922. Serial No. 539,123.

*To all whom it may concern:*

Be it known that I, JOSEPH L. COHEN, a citizen of the United States, resident of the borough of Manhattan, city, county, and State of New York, have invented certain new and useful Improvements in Vehicle Wheels, of which the following is a specification.

This invention relates to vehicle wheels, and more particularly to wheels of the type including sets of resilient spoke elements.

An object of the invention is to cheapen and simplify the construction of wheels of such type, and to produce a wheel which shall be stronger and more durable than such wheels as heretofore constructed.

An important feature of the invention consists in the provision of means for securing the inner ends of the spoke elements to the hub, constructed and arranged to constrain the spoke elements against lateral movement, and to permit their inner end portions to yield longitudinally of the elements. In the preferred embodiment of the invention, the inner ends of the spoke elements are arranged to abut against the periphery of the hub of the wheel, and the spoke elements of each set are spaced from each other and maintained against lateral movement in the plane of the wheel by rollers carried by the hub between the inner end portions of the elements. The spoke elements are also preferably provided on their inner ends with spacing members of such thickness relatively to the thickness of the spoke elements and the distance between adjacent rollers, and the rollers are arranged at such a distance from the peripheral surface of the hub, as to obviate all possibility of the inner ends of the spoke elements being withdrawn from between the rollers. A further feature of the invention contemplates the provision in each set of spoke elements of a resilient metal strip bent upon itself in the plane of the wheel adjacent to the felly, and having its inner end portions secured to the hub of the wheel so as to provide a pair of spoke elements, and means for rigidly supporting the strip at its bent portion.

The invention also aims to provide the combination with strips constituting spoke elements and having their transverse sections arranged axially of the hub of a wheel, of means for spacing the strips at their outer edges from their securing means, and a third spoke element comprising a resilient strip having its ends inserted into the spaces provided on the outer sides of the first-mentioned strips between their edges and the securing means. Still other objects and features of the invention will appear as the description proceeds, and will be pointed out in the appended claims.

In the drawings in which like reference numerals indicate identical parts in the various views:

Fig. 1 is a view in side elevation and partly in section of a wheel constructed in accordance with the invention, and Fig. 2 is a view looking from the right in Fig. 1, and having its upper portion taken substantially on the line 2—2 of Fig. 1.

The illustrated construction comprises a hub 2 formed at its rear end with an integral upwardly extending flange 4, and being provided at its front end with the usual threaded hub cap 6. The hub 2 is connected by sets 8 of spoke elements to a felly 10 which is formed on its inner and outer edges with inwardly extending lugs 12. Mounted in the lugs 12 on opposite sides of the felly are rods 14 carrying rollers 16 spaced from the inner surface of the felly 10.

Each of the sets 8 of spoke elements comprises a resilient metal strip bent upon itself, as indicated at 20, in the plane of the wheel about one of the rollers 16, thus providing a pair of resilient spoke elements 22 having their transverse sections arranged axially of the hub 2, or, in other words, transversely of the plane of the wheel. The inner ends 26 of the spoke elements 22 are arranged to abut against the peripheral surface of the hub 2.

The means for securing the spoke elements 22 to the hub 2 preferably comprises a ring 28 surrounding a reduced portion 29 of the hub and adapted for engagement at its outer end with an outwardly extending flange 30 on the hub cap 6. The ring 28 is caused to rotate with the hub 2 by means of keys 32 formed on the hub 2 and engaging correspondingly shaped slots or channels in the inner surface of the ring 28. The ring 28 is formed to provide a flange 34 extending outwardly from the hub 2 in substantial parallelism with the flange 4, and the ring 28 is further held against axial movement on the hub 2 by bolts 36 passing through the flanges 4 and 34 concentrically of the axis of the hub 2. Carried on the bolts 36 are rollers 38 which are disposed between the inner end portions of the elements 22 of each of the sets 8 of spoke elements. Secured to the spoke elements 22 at the outer sides of their inner end portions by screws or other suitable fastenings 42 are spacing members 40, the thickness of which is so proportioned to the thickness of the spoke elements 22 at their inner ends and to the distance between adjacent rollers 38 as to cause the adjacent spoke elements 22 of contiguous sets of such elements to be maintained tightly against their respective rollers.

The spoke elements 22 are preferably curved substantially uniformly between the rollers 16 and 38, the point of maximum remoteness of such elements being located substantially half way between the rollers. The rear edges of the elements 22 are also preferably curved at their inner portions, as indicated at 44, in Fig. 2, the base of the flange 4 of the hub 2 being correspondingly curved to assure a tight fit between the spoke elements and the hub. Preferably, and as shown, the outer edges 46 at the inner ends of the spoke elements 22 are substantially straight and are spaced from the flange 34 of the ring 28 by a spacing ring 48, Fig. 2, for a purpose to be hereinafter described. The length of the rollers 38 is greater than the width of the spoke elements 22 by the width of the spacing ring 48, so that when the nuts are tightened on the bolts 36 the flange 34 may be drawn tightly against the outer ends of the rollers.

The strip from which the spoke elements 22 are formed is rigidly supported at its bent portion 20 by a member 50 having its inner surface spaced from the periphery of the roller 16 and arranged in substantially concentric relation with the roller. The members 50 are U-shaped in longitudinal section and have their leg portions 52 mounted on the rods 14 between the edges of the spoke elements 22 and the inner surfaces of the lugs 12. The leg 52 of the member 50 at the outer side of the spoke elements is formed with a boss 54 which serves to space the outer edges of the spoke elements 22 from the adjacent lug 12.

Each of the sets 8 of spoke elements in addition to the spoke elements 22 includes a resilient strip 56 having its transverse sections arranged in the plane of the wheel and being reversely curved at its ends which are received within the spaces provided by the spacing ring 48 and the boss 54 on the member 50. As shown, the inner and outer ends of the strips 56 engage the inner surfaces of the flanges 34 and lugs 12 respectively, and the inner and outer end portions of the resilient strips 56 are formed with openings fitting over the outer ends of the rollers 38 and the bosses 54 respectively. As shown, the spoke elements or strips 56 are of substantially the same curvature and thickness as the spoke elements 22. The elements 56, however, are permitted to flex only between the adjacent surfaces of the rollers 38 and the bosses 54, whereas the spoke elements or strips 22 may flex within a range limited substantially by the centers of the rods 14 and bolts 36. Accordingly, the tension of the strips 56 is somewhat greater than that of the strips 22.

The wheel is provided with a rim 60 having outwardly turned flanges at its edges which embrace a solid tire 62 composed of rubber or other suitable material. The rim 60 is maintained in place on the felly 10 by wedge rings 64 which are adapted to be forced inwardly from the side edges of the felly 10 by means of cleats 66. The cleats 66 are disposed on the outer sides of the lugs 12 and are formed with openings fitting over the rods 14. Accordingly, the cleats 66 are forced inwardly upon the wedge rings 64 when the nut 68 on the rod 14 is turned in. From the foregoing, it will be understood that the rods 14 not only secure the spoke elements 22 to the felly 10 but also constitute a part of the means for locking the rim 60 in position on the felly.

The felly 10 is made of rigid material and does not flex in the use of the wheel. Accordingly, when the spoke elements which bear the load in the use of the wheel are flexed, the felly 10 is moved to a more or less eccentric position with relation to the axis of the hub. Upon the flexing of the spoke elements on the lower side of the wheel, those on the upper side of the wheel tend to straighten out and also to yield longitudinally at their inner end portions. By reason of the fact, however, that the rollers 38 are spaced by a considerable distance from the hub 2 and the spoke elements 22 are maintained tightly against the rollers 38 by the spacing members 40, the spoke elements are prevented from being pulled away from between the rollers 38. It has been found that by the use of this construction, the resilient spoke elements may be reliably secured at their inner end portions to the hub 2 without direct interlocking relation between the spoke elements and the securing means, such as is usually provided. In the provision of interlocking mechanism, it is usual to provide the inner end portions of the spoke elements with openings or notches which in connection with the securing means not only prevent any longitudinal yielding movement of the spoke elements, but which also detract considerably from the strength of such elements. The invention also avoids the use, in positions where such parts would be subjected to strain, of small parts, such as bolts or screws, which are likely to be broken or loosened by strain and thus reduce the durability of the wheel. On the contrary, the spoke elements of my improved wheel are secured in position both at their inner and outer ends by relatively few parts, and all parts which are in a position to be subjected to strain are adapted to be made of such size as to resist the strain without injury. It will, therefore, be manifest that this wheel, because of its relatively few and simple parts, can be very cheaply constructed, and that the improved wheel is also very strong and durable.

Having fully described the invention, what is claimed is:

1. In a vehicle wheel, a hub, a felly, a plurality of resilient spoke elements each consisting of a resilient spoke plate bent intermediate of its ends to provide oppositely bowed portions extending between the hub and felly, means for securing the intermediate portion of the spoke plate to the felly, and means mounted in the wheel hub between the ends of the spoke plate spacing said ends apart but permitting of their radial movement with respect to the hub in the flexing action of the bowed portions of the spoke plate.

2. In a vehicle wheel, a hub, a felly, a plurality of resilient spoke elements each consisting of a resilient spoke plate bent intermediate of its ends to provide oppositely bowed portions extending between the hub and felly, means for securing the intermediate portion of the spoke plate to the felly, and a roller mounted in the wheel hub interposed between the ends of the spoke plate to space the same apart, the ends of the plate having tangential contact upon the periphery of the roller and moving radially of the hub in the flexing movement of the bowed portions of said plate.

3. In a vehicle wheel, a hub, a felly, a plurality of resilient spoke elements each consisting of a resilient spoke plate bent intermediate of its ends to provide oppositely bowed portions extending between the hub and felly, means for securing the intermediate portion of the spoke plate to the felly, a roller mounted in the wheel hub interposed between the ends of the spoke plate to space the same apart, the ends of the plate having tangential contact upon the periphery of the roller and moving radially of the hub in the flexing movement of the bowed portions of said plate, and spacing means positioned in the hub between the ends of adjacent spoke plates to maintain said plates in contact with the rollers and prevent the relative movement of the ends of adjacent spoke plates circumferentially of the wheel hub.

4. In a vehicle wheel, a hub, a felly, a plurality of sets of rollers each comprising a roller mounted on the felly and a roller carried by the hub, a plurality of resilient spoke elements each having its medial portion engaged around one roller of a set and its ends arranged on opposite sides of the other roller of said set, and means for securing the sets of spoke elements in place on the wheel.

5. In a vehicle wheel, a hub, a felly, a plurality of sets of rollers each comprising a roller mounted on the felly and a roller carried by the hub, a plurality of sets of spoke elements each comprising a resilient metal strip associated with one of said sets of rollers, said strip being bent upon itself about one of the first-mentioned rollers and having its end portions arranged on opposite sides of the last-mentioned roller of said set, and means for securing the end portions of said strip to the hub.

6. In a vehicle wheel, a hub, a felly, a plurality of sets of spoke elements connecting said felly to said hub, each of said sets comprising a resilient metal strip bent upon itself and connected to the felly and having its ends arranged to abut against said hub, spacing members on the end portions of said strip, each of said spacing members being arranged to contact with the spacing member on the adjacent end of the contiguous strip, a roller carried by the hub between the ends of said strip and coacting with said spacing members to prevent lateral movement of the ends of the strip in the plane of the wheel, and means for securing the ends of said strip against axial movement relatively to the hub of the wheel.

7. In a vehicle wheel, a hub, a felly, members extending inwardly from the felly, a plurality of sets of spoke elements each comprising a strip of resilient metal bent upon itself in the plane of the wheel and having its bent portion mounted in said members, means for securing said strip to said hub, and means for spacing said strip from said members and said securing means, each of said sets of spoke elements also comprising a resilient element curved transversely of the plane of the wheel, and said element extending between the hub and the felly and having its ends arranged in the spaces provided by said spacing means.

8. In a vehicle wheel, a hub, a felly, members extending inwardly from the opposite side edges of the felly, a plurality of sets of spoke elements each comprising a strip of resilient metal bent upon itself in the plane of the wheel and having its bent portion mounted in said members, means for supporting the bent portion of the strip and spacing it from the member at the outer side of the felly, a flange on the hub engaging the rear edge of the strip at its inner end, a spacing ring on the hub for engagement with the outer edge of the strip opposite from said flange, and a securing ring mounted on said hub and formed with an outwardly extending flange arranged to fit against the spacing ring, each of said sets of spoke elements also including a resilient strip curved transversely of the plane of the wheel and having its ends reversely curved and arranged in the spaces provided by said spacing means and said ring with its inner and outer ends in engagement respectively with the flange on the securing ring and one of said inwardly extending members on the felly.

In testmony that I claim the foregoing as my invention, I have signed my name.

JOSEPH L. COHEN.